UNITED STATES PATENT OFFICE.

JOHN C. SCHRADER, OF McCAINSVILLE, NEW JERSEY, ASSIGNOR OF ONE-HALF TO RUSSELL S. PENNIMAN, OF JENKINTOWN, PENNSYLVANIA.

DYNAMITE.

SPECIFICATION forming part of Letters Patent No. 333,347, dated December 29, 1885.

Application filed June 3, 1884. Serial No. 133,730. (No specimens.)

*To all whom it may concern:*

Be it known that I, JOHN C. SCHRADER, of McCainsville, in the county of Morris and State of New Jersey, have invented certain new and useful Improvements in High Explosive Compounds; and I do hereby declare that the following specification is a clear, true, and complete description of my invention.

So far as my knowledge extends I am the first to invent and produce a dry-grained free-running high-grade nitro-glycerine powder, and different types thereof constitute the subjects of separate applications for Letters Patent.

My novel powder as a class, although containing large proportions of the liquid explosive, ranging from ten per cent. upward, are not so adversely affected by low temperatures as ordinary dynamite, and are safe in handling and in transportion, and they can be employed as conveniently as ordinary black blasting-powder in all connections where a free-running powder is deemed desirable.

The subject hereinafter described is a dry-grained free-running powder containing as high as, say, twenty per cent. of nitro-glycerine or any lesser proportion of the liquid explosive that may be deemed desirable.

The novel powder herein described is composed of nitro-glycerine and of hard friable cellular grains, containing particles of solid carbonaceous matter bound together by melted sulphur in such a manner that, although said grains are able to resist the softening influences of the liquid explosive, they are capable of taking in and retaining by capillary attraction large and effective proportions thereof, and in their best form said grains also contain a nitrate.

In the production of this variety of my powder any of the well-known solid carbonaceous matters may be employed; but, having reference to effective results and economy, bituminous coal is preferred.

The cellular grains which constitute the novel characteristic of my powder are produced by me by compounding in a finely-ground condition twelve (12) parts bituminous coal, sixteen (16) parts sulphur, and seventy-two (72) parts nitrate of soda. These ingredients are well mixed and heated to melt the sulphur, and are then stirred while cooling to develop the mass into distinctive grains substantially uniform in bulk as far as may be practicable; or the mass while soft is compressed into cakes, and then granulated when cold and hard, as by means of a toothed cylinder, as practiced in the manufacture of ordinary black powder. The grains thus produced should seldom, if ever, be finer than would pass through a twelve-mesh sieve or coarser than would pass through a four-mesh sieve, and, if desired, they can be graded by screening, so as to be substantially uniform in bulk.

The proportions of the ingredients named may be varied without departure from my invention; but the sulphur should be used in sufficient relative quantity to operate adhesively and bind together the particles of carbon and nitrate, and such an excess of sulphur as would result in grains incapable of taking in the liquid explosive should be avoided.

When made as described, each grain embodies a cellular structure of sulphur, with which the carbon and nitrate are so combined that they cannot be appreciably softened or disintegrated by the liquid explosive, although the latter freely penetrates the cells of the grain which, because of the sulphur housing, is enabled to substantially maintain the hard or friable characteristics of an uncharged grain.

Although for obtaining the best results I use nitrate of soda in the grains, as described, it is obvious that equivalent salts may be employed, and that, even if the nitrate be omitted, the grains will still possess their novel characteristics, and be capable of housing very effective quantities of the liquid explosive and afford a compound of great value, although less desirable than if a nitrate or its equivalent be employed.

My high-explosive powder is radically unlike that variety of low-grade nitro-glycerine powder composed of grains, which are only superficially coated with nitro-glycerine, because of the intentional incapacity of said grains to take up any appreciable quantity of the liquid explosive. The soft-surface coating of nitro-glycerine upon such grains renders them more or less adhesive, and such powder is not only unlike my dry-grained powder in that respect, but it is not and cannot be raised to a high-grade powder, because such grains are incapable of effectually controlling more than, say, from three to five or six per cent. of the liquid explosive.

My powder is also radically unlike certain other varieties of low-grade nitro-glycerine powders which are composed of finely-comminuted solid matters, and, say, from three to six per cent. of the liquid explosive, because the solid matter referred to is in such a finely-comminuted condition that any greater proportion of the liquid will render the mass clingy or pasty, and although such powders are of the low-grade variety they are not free running, because of the natural cohesion of the finely-comminuted solid matters, and also because of the incapacity of said solid matters to take up and house effective proportions of the liquid explosive without becoming adhesive, and also because of the employment in many cases of solid matters which readily succumb to the softening influences of the liquid explosive.

In one variety of powder of this last-named class finely-powdered sulphur, coal, and nitrate have been heretofore employed, and in preparing the same the mass is heated, but when cooled the resultant product is changed but little from its original condition as to its comminuted character, because the proportion of sulphur employed therein is so small that each particle thereof serves merely as a nucleus to which adjacent particles of nitrate and carbon adhere, and therefore the sulphur does not and cannot operate as a grain-building medium in forming the cellular structure of melted sulphur, which is a characteristic feature in my powder.

It is obvious that additional ingredients may be employed in the grained compound without substantial departure from my invention, provided nothing is added which will materially impair the capacity of the grains for taking up the liquid explosive by plugging or sealing the cells of the grains against its entrance, as by the use of tar, asphaltum, &c.

In a separate application for Letters Patent I describe and claim powders differing from those hereinbefore described, in that I therein employ natural absorbents, such as wood pulp or other fibrous vegetable matter.

The grains herein described constitute one form of novel "dope," and the manufacture of the powder described involves the practice of a novel process, both of which were invented by me and constitute the subjects of separate applications for Letters Patent.

Having thus described this portion of my invention, I claim as new and desire to secure by Letters Patent—

The explosive compound, substantially as hereinbefore described, containing nitro-glycerine housed and retained within hard cellular grains composed in part of particles of solid carbonaceous matter held by a porous structure of sulphur.

JOHN C. SCHRADER.

Witnesses:
 JAS. H. NEIGHBOUR,
 FRANK F. HUMMEL.